United States Patent [19]
Erst

[11] 3,789,398
[45] Jan. 29, 1974

[54] FM-CW RADAR RANGE SYSTEM
[75] Inventor: Stephen J. Erst, New Haven, Ind.
[73] Assignee: International Telephone and Telegraph Corporation, Nutley, N.J.
[22] Filed: Mar. 12, 1959
[21] Appl. No.: 799,048

[52] U.S. Cl. .............................................. 343/14
[51] Int. Cl. ............................................. G01s 9/24
[58] Field of Search .................................... 343/14

[56]        References Cited
         UNITED STATES PATENTS
2,453,169   11/1948   Varian ................................. 343/14
2,907,023    9/1959   Skinner ................................ 343/14

Primary Examiner—Malcolm F. Hubler
Attorney, Agent, or Firm—John T. O'Halloran; Menotti Lombardi, Jr.; Alfred C. Hill

EXEMPLARY CLAIM

5. A continuous wave radar system comprising: a source of sine wave signals; first means for frequency modulating a carrier frequency with said sine wave signals to provide a first frequency modulated signal; means for transmitting said first frequency modulated signal; second means for frequency modulating a carrier frequency with said sine wave signals to provide a second frequency modulated signal, the carrier frequency of said second frequency modulating means being the same as the carrier frequency of said first modulating means; phase shifting means coupled between said source of sine wave signals and one of said modulating means; means for receiving said first frequency modulated signal reflected from a distant object; means for mixing the received signal with said second frequency modulated signal; band pass filter means coupled to the output circuit of said mixing means and tuned to pass one side band component at least as high as the sixth contained in the output from said mixing means; and detector means coupled to said band pass filter means; and means for providing a fixed phase displacement between said transmitted signal and said other frequency modulated signal sufficient to provide in said one side band a first response peak at close range and a second response peak at a substantially greater range with no response peaks therebetween.

12 Claims, 6 Drawing Figures

Inventor:
Stephen J. Erst,
by Gust & Irish
Attorneys.

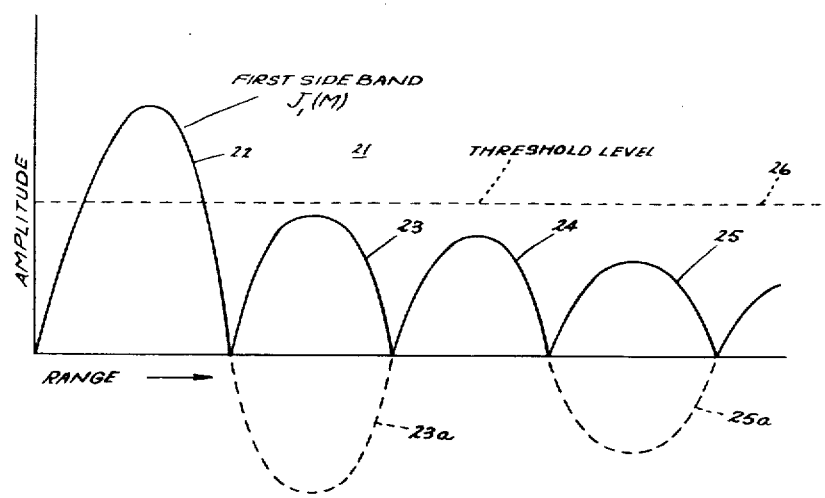
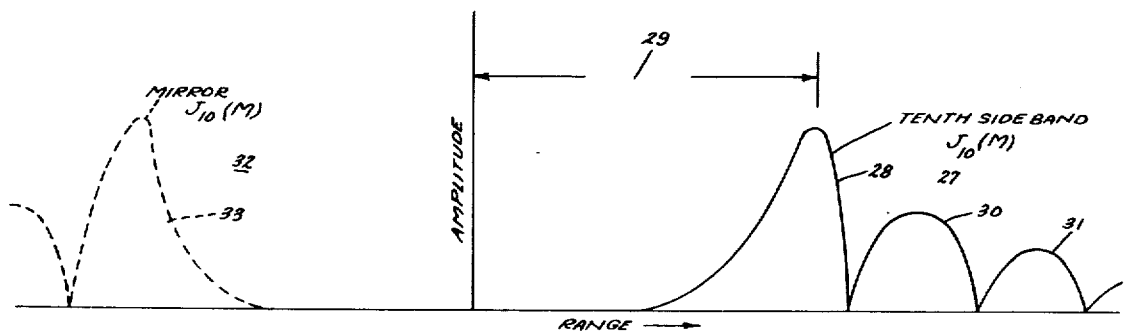
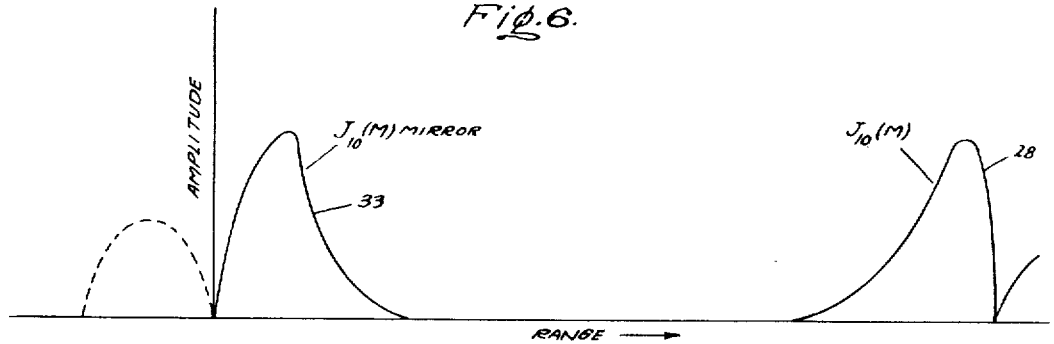

FM-CW RADAR RANGE SYSTEM

This invention relates generally to radar systems and methods, and more particularly to radar systems of the frequency modulated continuous wave type, and to methods utilizing such systems to provide range discrimination.

Conventional radar systems provide range information, i.e., the location of a distant object, throughout substantially the entire range of the apparatus. In such conventional radar systems, a transmitted signal is reflected from a distant object and received by a local receiver, the transmitted signal generally initiating a sweep on a cathode ray tube with the received signal being displayed on the tube, thus providing continuous indication of the range of the distant object. Such conventional radar systems have employed pulse techniques, i.e., the transmission of short high-frequency pulses, and thus, in order to provide range information at close distances, extremely short pulse widths are required. In addition, as indicated, such conventional radar apparatus provides a signal return from all targets within the range of the transmitted signal. Furthermore, such conventional pulsed radar apparatus has required complex, heavy and expensive components.

There are applications for radar systems in which it is desired to provide an output signal when the distant object is at a given range from the transmitting equipment, and at no other time, and it may further be desired that such an output signal be provided when the object is at an extremely close range from the transmitting apparatus; such functioning is conventionally referred to as "range discrimination". Another type of radar system, which has been referred to as an FM-CW system (frequency modulated-continuous wave) utilizes a transmitted signal which is continuously frequency modulated by a single sinusoidal signal with a portion of the transmitted signal being mixed with the received signal. Analysis of the spectral content of the resulting signal output of the mixer reveals that the individual side bands have an amplitude which is range dependent. Thus, it is known to filter the output of the mixer to obtain the harmonic or side band of the mixed signal which provides the desired range response characteristic. Each harmonic or side band of the signal resulting from mixing the received signal and the transmitted signal has a first major amplitude peak at a range dependent upon the side band number and further has a succession of subsequent amplitude peaks diminishing in magnitude with increasing range. Thus, in prior FM-CW radar systems known to the present applicant, the first detected signal peak of the selected side band is utilized as an output signal, the particular side band selected thus providing the requisite range discrimination. However, it has been found that in some instances, false or premature signals may be provided by the second or subsequent amplitude peaks of the selected side band; targets, other than the intended target, having unusually high signal reflectivity (such as large bodies of water) and at a distance from the equipment farther than the range of the first signal amplitude peak may provide a second or even higher numbered peak of sufficient amplitude to energize the circuitry connected to the output of the detector. It is therefore desirable to provide a continuous wave frequency modulated radar system and method in which range discrimination is provided with the unwanted response peak or peaks which provide erroneous responses in present systems of this type being eliminated.

Mathematical analysis, by such means as Bessel functions, of the amplitude variation of the side bands contained in the output of the mixer in a CW-FM radar system reveals (and laboratory experimentation demonstrates) that the amplitude variation of each side band redundantly repeats or mirrors at ranges corresponding to successive 180° of phase displacement between the transmitted and received signals. Such mathematical analysis further reveals that the cyclic amplitude characteristic of each side band can be said to mirror negatively, i.e., at what might be referred to as a negative range from the transmitting equipment. Thus, considering the case of a higher order side band, such as the tenth, which has its first peak at a considerable range from the transmitting equipment (in contrast with the carrier component which has its first peak at zero range, and the first side band which has its first peak at very close range), it is seen that there is, hypothetically at least, a first negative redundant or mirror peak at a negative range from the transmitting equipment, equal to the range of the first positive peak of such higher order side band from the transmitting equipment, the total distance between these two peaks being twice the range of the first positive amplitude peak of such higher order side band. Such higher order side bands have not ordinarily been employed in CW-FM radar systems since the targets of interest are generally at a much closer range and also since the attenuation of signals at the range of the first peak of such higher order side bands is ordinarily so great that an insufficient output signal level is provided. I have found, however, that by shifting the phase of the signal mixed with the received signal with respect to the transmitted signal by a predetermined amount, the first negative redundant or mirror peak of a higher order side band can in effect be shifted into the positive range region to provide a signal response at a very close range. Stated differently, by introducing a phase displacement or time delay between the transmitted signal and the signal which is mixed with the received signal, the range base line can be said to be shifted outwardly until the first response peak of a higher order side band which appears is what was formerly the second major redundant peak of such side band. Thus, by the extraction and detection of a high order side band and the phase shifting of the transmitted signal with respect to the signal mixed with the received signal, the next redundant peak following the first response peak is that of the former first peak of the selected higher order side band (which has been displaced outwardly in range a corresponding amount) however, propagation losses at this greater range results in a signal response from what is now the second peak which will always be insufficient to provide false operation of the equipment connected to the radar apparatus.

It is accordingly an object of my invention to provide an improved FM-CW radar system.

Another object of my invention is to provide an improved FM-CW radar system which provides range discrimination at close ranges superior to that provided by prior systems of this type.

A further object of my invention is to provide an improved method for obtaining range discrimination in an FM-CW radar system.

The above-mentioned and other features and objects of this invention and the manner of attaining them will become more apparent and the invention itself will be best understood by reference to the following description of an embodiment of the invention taken in conjunction with the accompanying drawings, wherein:

FIG. 4 shows the amplitude of the detected tenth side band ($J_{10}$) in a conventional CW-FM radar system;

FIG. 5 shows the redundancy or mirroring of the detected tenth side band and is useful in explaining the invention; and FIG. 6 shows the amplitude of the detected tenth side band in the improved CW-FM radar system of my invention.

Figure 1:
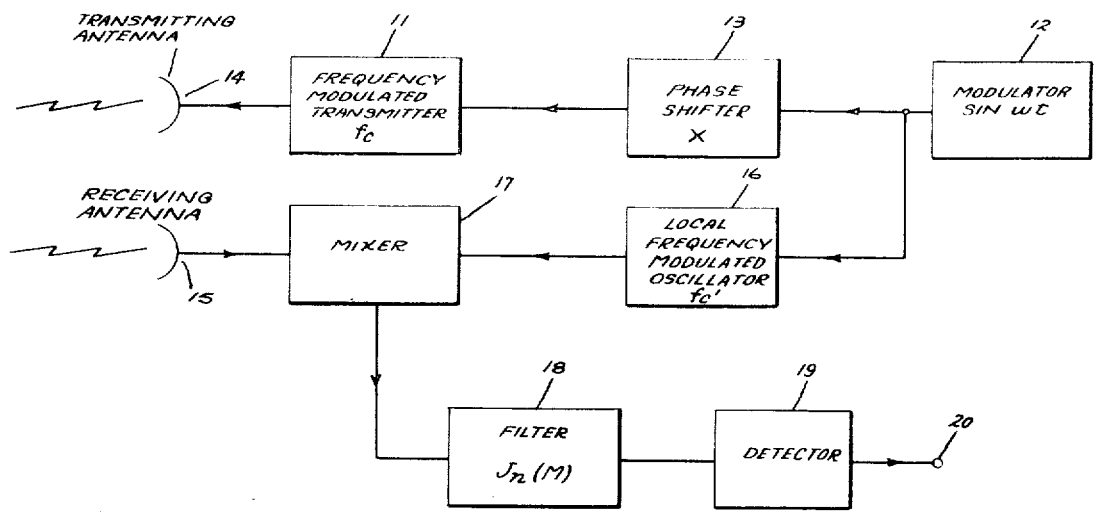
FIG. 1 is a schematic block diagram showing one embodiment of my invention.

Referring now to FIG. 1, in accordance with my invention, I provide a frequency modulated transmitter 11 which is continuously frequency modulated by a high purity sinusoidal wave provided by modulator 12. As will be hereinafter more fully described, the modulation index "B" must be reasonably high in order to insure the generation of side bands of moderately high order while the deviation must be kept at a reasonably low degree in order to prevent the generation of amplitude modulated signals. Since the system will generally be operated in the microwave region, the frequency modulated transmitter 11 may conventionally be a klystron tube with a suitable carrier frequency being 9,000 mc and a suitable modulation frequency being 150 kc. As will hereinafter be more fully described, a phase shifting network 13 providing a predetermined phase shift or phase delay $x$ is inserted between the modulator 12 and the frequency modulated transmitter 11. The output of the frequency modulated transmitter 11 is fed to transmitting antenna 14 which may be of any conventional type, the signal being then radiated by the transmitting antenna 14 to the target and being reflected therefrom and picked up by the receiving antenna 15.

In accordance with my invention, a local frequency modulated oscillator 16 is provided which is likewise continuously frequency modulated by the sine wave provided by the modulator 12, frequency modulated oscillator 16 having the same carrier frequency as frequency modulated transmitter 11. It will now be seen that the frequency modulated signal provided by the frequency modulated transmitter 11 and transmitted by the antenna 14 and the frequency modulated signal provided by the local frequency modulated oscillator 16 are identical, i.e., having the same carrier frequency and modulating frequency, being merely phase shifted one with respect to the other by the amount of the predetermined phase delay $x$ provided by the phase shifting network 13. It will hereinafter be readily apparent that phase shifting network 13 may equally advantageously be inserted between the local frequency modulated oscillator 16 and the modulator 12.

The signal reflected from the distant target and picked up by the receiving antenna 15, and the frequency modulated output signal of the local frequency modulator oscillator 16 are mixed in mixer 17, which may be of the type commonly referred to as a "magic T" mixer. Mixing of the returned signal as picked up by the receiving antenna 15 and the output of the local frequency modulator oscillator 16 (which, as indicated, is responsive to the transmitted signal but phase shifted with respect thereto by a predetermined amount $x$) provides in the output circuit of mixer 17 a signal containing side bands of frequency 0 and harmonics of the modulation frequency. Since the mixer 17 functions as a first detector in which the carrier is removed, the carrier component in the output signal of mixer 17 actually has only a DC component containing the doppler frequency. The output signal from mixer 17 may be amplified by a conventional video amplifier (not shown) and is in turn fed to a suitable band pass filter 18 which passes the desired higher order side band ($J_n$); I consider that my invention has greatest utility with a side band at least as high as the eighth being passed by the filter 18, and I do not believe that any side band lower than the sixth will provide the desired range discrimination. The output of filter 18 is in turn detected by a second detector 19 with its detected output signal in turn being available at output terminal 20 to which other circuitry (not shown) which utilizes the output signal of the system is connected.

Figure 3:
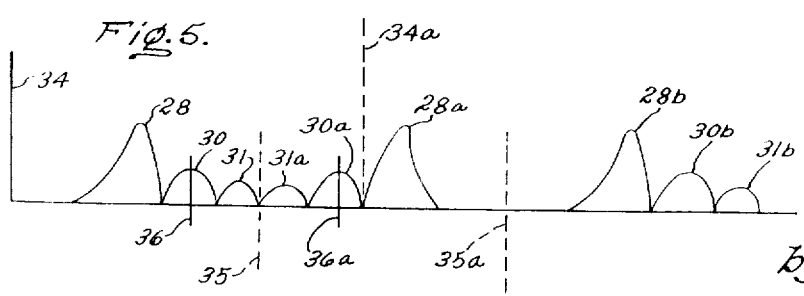
FIG. 3 shows the amplitude of the first side band ($J_1$) in an FM-CW radar system.

Referring now briefly to FIG. 3 in which the amplitude of the detected signal is plotted against range, the range-response characteristic of the first side band ($J_1$) of prior conventional FM-CW systems is shown by the curve 21 which includes a first major peak 22 and second and third and fourth peaks 23, 24 and 25; it will be observed that the second and fourth peaks 23 and 25 are the detected negative peaks 23a and 25a. It will further be seen that the peaks 22, 23, 24 and 25 are those of the Bessel function of the first kind, first order and of argument M. Horizontal line 26 in FIG. 3 represents a predetermined threshold signal of the utilization circuitry connected to the output terminal 20 of detector 19, i.e., the signal level which will initiate the desired operational sequence. It is seen that in FIG. 3 only the first peak 22 of the range response characteristic 21 is higher than the threshold signal level 26. However, it will be readily comprehended that a target of high signal reflectivity, such as a large body of water, may very possibley result in a returned signal in which the second peak 23 or even the third peak 24 would have an amplitude higher than the threshold signal level 26, thus providing a premature range response output signal.

Referring now to FIGS. 4 and 5 in which there is shown the range response characteristic of the tenth side band ($J_{10}$), it will be seen that the tenth side band has a range response characteristic 27 with a first major peak 28 appearing outwardly from the transmitting equipment at a range 29 and having minor peaks 30, 31, et seq. continuing in diminishing cyclic fashion. As indicated herein before and shown in FIG. 5, the range-response amplitude characteristic of each of the side bands mirrors at a given range outwardly from the transmitting apparatus to provide redundant peaks as shown at 23a, 30a, 31a, 28b and 30b. This mirroring or redundancy in the range response characteristic is due to the fact that there can be only a maximum of 180° of phase displacement between the transmitted and received signals. In FIG. 5, this maximum 180° phase displacement occurs at a range indicated by the dashed line 35. It will thus be seen that the phase displacement between the transmitted and received signals side of the 180° phase displacement range 35, and thus, ignoring attenuation, that the amplitudes of the range response characteristic at ranges is the same at the range indicated by the line 36 as at the range indicated by the line 36a, i.e., at the same range on either side of the 180° phase displacement range 35, and thus, ignoring attenuation, that the amplitudes of the range response characteristic at ranges 36 and 36a will be identical. Therefore, the range response characteristic outwardly between the first 180° phase displacement range 35 to the next 180° phase displacement range 35a is the obverse or mirror of that between the base line 34 and the first 180° phase displacement range 35 as shown at 31a, 30a and 28a. Outwardly from the second 180° phase displacement range, the response characteristic is duplicative of that from the base line 34 to the first 180° phase displacement range 35, as shown at 28b, 30b and 31b. Further, as indicated hereinbefore, mathematical analysis reveals hypothetically a negative mirror of each harmonic at a negative range from the transmitting apparatus and thus, as shown in FIG. 4, the tenth side band may be said to have a negative mirrored or redundant range response characteristic as shown in dashed lines at 32; the negative range response amplitude characteristic of the 10th side band thus has a first major peak 33 at a negative range from the transmitting apparatus equal to the positive range 29 of the first major peak 28 and thus, the range between the first major peak 28 and its negative mirror peak 33 is twice the range 29. Referring now additionally to FIG. 6, it will be seen that if the 10th side band range-response characteristic could be shifted to the right, i.e., outwardly in range, to bring the first mirror peak 33 of the mirrored range-response characteristic 32 into the positive region, the range-response peak 28 would likewise be shifted outwardly in range, it being observed that there are no other range response characteristic peaks in the 10th harmonic between the peaks 28 and 33. As another way of viewing the matter and referring to FIG. 5, if the base line 34 could be shifted outwardly to the position shown in the dashed line 34a in FIG. 5, it will be seen that the first response peak now to appear is 28a, which formerly was the second major response peak, and that the second major response peak is now 28b, which formerly was the third major response peak. Whichever approach is used, i.e., shifting the tenth side band range response characteristic, or shifting the range base line of the tenth side band, it will be seen that the mirrored peak 33 or the second major peak 28a of the 10th side band would provide the requisite close range discrimination with the next peak 28 or 28b being sufficiently far out in range that attenuation would reduce any signal responsive thereto to a sufficiently low level as to be of no consequence.

Turning now to mathematical analysis of the foregoing, the frequency modulated signal transmitted by the transmitting antenna 14 is represented by the expression $$E = A \cos(wt + \beta \cos \mu t + \delta)$$

where:

$A$ is a constant representing magnitude
$W = 2\pi f_c$ where $f_c$ is the transmitter frequency
$\beta$ = modulation index (deviation/modulation frequency)
$\mu = 2\pi f_m$ where $f_m$ is the modulation frequency
$t$ is time $\delta$ is a phase angle, reflected by a target and returned to receiving antenna 15 delayed by a time T corresponding to range by the relation $T = 2D/C$ where $D$ is one way range and $C$ is the velocity of propagation.

It will be readily understood that the transmitted wave is reflected by a target and returned to receiving antenna 15 delayed by a time T corresponding to range by the relation $T = 2D/C$ where $D$ is one way range and $C$ is the velocity of propagation.

Thus, the received signal is represented by the expression $e = a \cos(w(t - T) + \beta \cos \mu(t - T) + \delta)$ where $a$ is dependent upon the signal amplitude and system gain and represents the summation of the losses and gains in a system such as attenuation, target reflectivity, propagation, losses, etc.

Now, letting the output signal of the local frequency modulated oscillator 16 be represented by the expression $e' = b \cos(w'(t + x) + \beta \cos \mu(t + x) + \delta)$ where $w'$ = the local oscillator frequency multiplied by $2\pi$ and $x$ represents the phase shift or phase delay inserted by the phase shifting network 13.

The received signal $e$ and the output $e'$ of the local frequency modulated oscillator 16 are compared in mixer 17 and the resulting voltage is expressed as $v = d \sin \Delta$ where $\Delta$ represents the phase difference between the amplitude of the received signal and the amplitude of the output of the local frequency modulated oscillator 16, i.e., $e$ and $e'$ respectively. Thus:

$$\Delta = w(t - T) + \beta \cos \mu(t - T) + \delta - [w'(t + x) + \beta \cos \mu(t + x) + \delta]$$

As indicated above, the carrier frequency of the local frequency modulator oscillator 16 and that of the frequency modulator transmitter 11 are identical, and thus in the above expressions, $w$ equals $w'$, and therefore:

$\Delta = -w(T + x) + \beta[\cos \mu(t - T) - \cos \mu(t + x)]$. The expression $\cos \mu(t - T) - \cos \mu(t + x)$ can be expanded to $2 \sin(\mu t + [(C \mu x - 2D \mu)/2C]) \sin[(\mu x C + 2 \mu D)/2C]$ and thus, $\Delta$ becomes $= -w(T + x) + 2 \beta \sin(\mu t + [C \mu x - 2 \mu D)2C]) \sin(\mu x C + 2 \mu D/2C)$ Let $M = 2 \mu \sin(C \mu x + 2 \mu D/2C)$
$v = d \sin[-w(2D + Cx/C) + M \sin(\mu t + [C \mu x - 2 \mu D/2C])]$ which can be further expanded as the sine of the difference of two angles.

$$v = d \left[ \left[ \sin \left[ M \sin \left( \mu t + \frac{C\mu x - 2\mu D}{2C} \right) \right. \right. \right.$$

$$\left. \cos \left( -w \frac{(2D - Cx)}{C} \right) \right]$$

$$- \cos \left[ M \sin \left( \mu t + \frac{C\mu x - 2\mu D}{2C} \right) \right.$$

$$\left. \left. \left. \sin \left( -w \frac{(2D - Cx)}{C} \right) \right] \right] \right]$$

This can be represented in Bessel series as:

$$v = d \left\{ 2 \left[ J_1(M) \sin \left( \mu t + \frac{C\mu x - 2\mu D}{2C} \right) \right. \right.$$

$$+ J_3(M) \sin\left(3\mu t + \frac{C\mu 3x - 6\mu D}{2C}\right)$$

$$+ J_5(M) \ldots \ldots \Bigg]\left[\cos\left(-w\left(\frac{2D-Cx}{C}\right)\right)\right]$$

$$-\Bigg[J_0(M) + 2\Bigg[J_2(M)\cos\left(2\mu t + \frac{C2\mu x - 4\mu D}{2C}\right)$$

$$+ J_4(M) \cos\left(4\mu t + \frac{C4\mu x - 8\mu D}{2C}\right)$$

$$+ J_6(M) \cos \ldots \ldots \Bigg]\left[\sin\left(-w\frac{(2D-Cx)}{C}\right)\right]\Bigg\}$$

Choosing a component which is the $n^{th}$ side band, we have $$v = d2J_n(M)\left[\sin\left(n\mu t + n\mu\frac{(Cx-2D)}{2C}\right)\right]$$

$$\left[\cos\left(-w\frac{(2D-Cx)}{C}\right)\right]$$

which after detection becomes $$v = \int |J_n(M)|\left|\cos - w\frac{(2D-Cx)}{C}\right|$$

The above expression is the amplitude of the detected output signal of detector 19, it being recognized that the term cos $(-w [(2D - Cx)/C])$ is doppler modulation. Furthermore, the term $J_n(M)$ or, more specifically, $J_n [2 \beta \sin (C \mu x = 2 \mu D/2C]$ will be recognized as having an amplitude dependent upon range $D$ and the value of the inserted phase delay time $x$. It will be seen that the aforementioned mirroring or redundancy is inherent in the foregoing development.

Taking a specific example with the modulating and carrier frequencies indicated hereinabove, i.e., 9,000 mc and 150 kc, it will be assumed that the range of interest is 200 feet beginning at range 0, and that all other range-response peaks must be displaced in range to such a degree as to be sufficiently attenuated to be unrecognizable. In order to insure the generation of side bands of a sufficiently high order, i.e., the 10th side band ($J_{10}$ with $J_{10}$ being equal to zero at 400 feet when $x = 0$), $B$ must, as previously indicated, be reasonably high, e.g., 14.5. As further previously indicated, deviation must be kept to a low degree in order to prevent the generation of amplitude modulated signals. The value of $x$ in this case must be (800 feet/$C$) since the desired function should start from zero, and thus, the necessary phase shift or phase delay is $-44°$, which, it has been found, yields a resultant range-response characteristic as shown in FIG. 5. Here, the unwanted range response peak 28 (or 28$b$) is at a range of 720 feet, and thus will suffer propagation losses of from ($1/D$) to ($1/D4$), depending upon the target reflectivity. Thus, assuming a large target, such as the ocean, the relative amplitude of the 720 foot peak 28 (28$b$) would be ($1/720 - 80$) or ($1/640$) of the first or mirror peak 33 (28$a$), or $-56.6$ db. It will, of course, be readily understood that the above specific example is intended merely to illustrate the functioning of my improved system and method and does not necessarily represent the best obtainable response characteristic.

It will be readily understood that in accordance with my improved method of obtaining close-in range response in a CW-FM radar system with displacement of unwanted responses outwardly in range so that the resultant attenuation renders them insignificant, it is merely necessary to provide a phase shift or phase delay between the transmitted frequency modulated signal and the frequency modulated signal which is mixed with the returned signal. Thus, in the embodiment of FIG. 1 it will be seen that the phase shifter 13 could be inserted between modulator 12 and frequency modulated transmitter 11, or alternatively between modulator 12 and the local frequency modulated oscillator 16.

Figure 2:
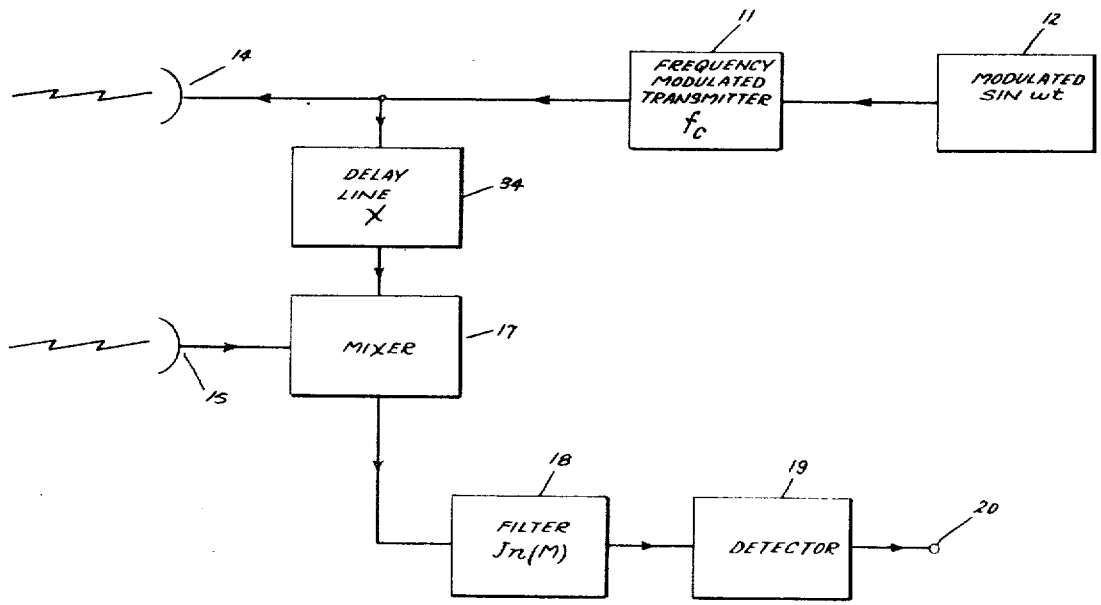
FIG. 2 is a schematic block diagram showing another embodiment of my invention.

Referring now to FIG. 2 in which like elements are indicated by like reference numerals, it will be observed that this phase delay may be equally advantageously provided by means of a suitable delay line 34 connected between the output of frequency modulated transmitter 11 and mixer 17. Thus, a portion of the transmitted signal from frequency modulated transmitter 11 is fed to mixer 17 to be mixed with the returned signal received by the receiving antenna 15, this portion being delayed in phase by the predetermined amount $x$ by means of the delay line 34.

It will now be seen that my improved FM-CW radar system and the method of obtaining range discrimination therewith provides, for the first time, to the best of the present applicant's knowledge, a close-in range response peak with no other range response peaks appearing within a range to provide unwanted or spurious responses.

While I have described above the principles of my invention in connection with specific apparatus, it is to be clearly understood that this description is made only by way of example and not as a limitation to the scope of my invention.

What is claimed is:

1. A continuous wave radar system comprising: means for providing a frequency modulated signal; means for transmitting said signal; means for receiving the transmitted signal reflected from a distant object; means for mixing the received signal with another frequency modulated signal identical in frequency and waveform to said transmitted signal; detector means coupled to the output circuit of said mixing means by band pass filter means, said band pass filter means being tuned to pass one side band component at least as high as the sixth contained in the output signal from said mixing means; and means for providing a fixed phase displacement between said transmitted signal and said other frequency modulated signal sufficient to provide in said one side band a first response peak at close range and a second response peak at a substantially greater range with no response peaks therebetween.

2. A continuous wave radar system comprising: a source of sine wave signals; means for frequency modulating a carrier frequency with said sine wave signals; means for transmitting the frequency modulated signal; means for receiving the transmitted signal reflected from a distant object; means for mixing the received signal with another frequency modulated signal identical in frequency and waveform to said transmitted signal; detector means coupled to the output circuit of said mixing means by band pass filter means, said band pass filter means being tuned to pass one side band component at least as high as the sixth contained in the output signal from said mixing means; and means for providing a fixed phase displacement between said transmitted signal and said other frequency modulated signal sufficient to provide in said one side band a first response peak at close range and a second response peak at a substantially greater range with no response peaks therebetween.

3. A continuous wave radar system comprising: a source of sine wave signals; means for frequency modulating a carrier frequency with said sine wave signals, said modulating means having a relatively high modulation index and relatively mow deviation thereby generating high order side bands and preventing the generation of amplitude modulation signals; means for transmitting the frequency modulated signal; means for receiving the transmitted signal reflected from a distant object; means for mixing the received signal with another frequency modulated signal identical in frequency and waveform to said transmitted signal; band pass filter means coupled to the output circuit of said mixing means and tuned to pass one side band component at least as high as the sixth contained in the output signal from said mixing means; detector means coupled to said band pass filter means; and means for providing a fixed phase displacement between said transmitted signal and said other frequency modulated signal sufficient to provide in said one side band a first response peak at close range and a second response peak at a substantially greater range with no response peaks therebetween.

4. A continuous wave radar system comprising: a source of sine wave signal; first means for frequency modulating a carrier frequency with said sine wave signals to provide a first frequency modulated signal; means for transmitting said first frequency modulated signal; second means for frequency modulating a carrier frequency with said sine wave signals to provide a second frequency modulated signal, the carrier frequency of said second modulating means being the same as the carrier frequency of said first modulating means; means for shifting the phase of one of said frequency modulated signals with respect to the other; means for receiving said first frequency modulated signal reflected from a distant object; means for mixing the received signal with said second frequency modulated signal; band pass filter means coupled to the output circuit of said mixing means and tuned to pass one side band component at least as high as the sixth contained in the output from said mixing means; and detector means coupled to said band pass filter means; said phase shifting means shifting the phase of said one frequency modulated signal by a fixed amount sufficient to provide in said one side band a first response peak at close range and a second response peak at a substantially greater range with no response peaks therebetween.

5. A continuous wave radar system comprising: a source of sine wave signals; first means for frequency modulating a carrier frequency with said sine wave signals to provide a first frequency modulated signal; means for transmitting said first frequency modulated signal; second means for frequency modulating a carrier frequency with said sine wave signals to provide a second frequency modulated signal, the carrier frequency of said second frequency modulating means being the same as the carrier frequency of said first modulating means; phase shifting means coupled between said source of sine wave signals and one of said modulating means; means for receiving said first frequency modulated signal reflected from a distant object; means for mixing the received signal with said second frequency modulated signal; band pass filter means coupled to the output circuit of said mixing means and tuned to pass one side band component at least as high as the sixth contained in the output from said mixing means; and detector means coupled to said band pass filter means; and means for providing a fixed phase displacement between said transmitted signal and said other frequency modulated signal sufficient to provide in said one side band a first response peak at close range and a second response peak at a substantially greater range with no response peaks therebetween.

6. A continuous wave radar system comprising: a source of sine wave signals; means for frequency modulating a carrier frequency with said sine wave signals; means for transmitting the frequency modulated signal; means for receiving said signal reflected from a distant object; means for mixing the received signal and a portion of the transmitted signal; means for shifting the phase of said portion of said transmitted signal with respect to said transmitted signal; band pass filter means coupled to the output circuit of said mixing means and tuned to pass one side band component at least as high as the sixth contained in the output from said mixing means; and detector means coupled to said band pass filter means; said phase shifting means shifting the phase of said portion of said transmitted signal by a fixed amount sufficient to provide in said one side band a first response peak at close range and a second response peak at a substantially greater range with no response peaks therebetween.

7. A continuous wave radar system comprising: a source of sine wave signals; means for frequency modulating a carrier frequency with said sine wave signals; means for transmitting the frequency modulated signal; means for receiving said signal reflected from a distant object; mixing means having one input circuit coupled to said receiving means and its other input circuit coupled to said modulating means by time delay means for mixing the received signal with a portion of the transmitted signal phase shifted with respect to the transmitted signal; band pass filter means coupled to the output circuit of said mixing means and tuned to pass one side band component at least as high as the sixth contained in the output from said mixing means; and detector means coupled to said band pass filter means; said time delay means shifting the phase of said portion of said transmitted signal by a fixed amount sufficient to provide in said one side band a first response peak at close range and a second response peak at a substantially greater range with no response peaks therebetween.

8. The method of obtaining radar range discrimination in a continuous wave radar system comprising the steps of: generating a first frequency modulated signal; transmitting said first frequency modulated signal; receiving said signal reflected from a distant object; mixing the received signal with a second frequency modulated signal identical in frequency and waveform to said first frequency modulated signal; filtering the signal resulting from said mixing to pass one side band; at least as high as the sixth; and shifting the phase of one of said first and second frequency modulated signals with respect to the other by a fixed amount sufficient to provide in said one side band a first response peak at close range and a second response peak at a substantially greater range with no response peaks therebetween.

9. The method of claim 8 comprising the additional step of detecting the signal resulting from said filtering.

10. The method of obtaining radar range discrimination in a continuous wave radar system comprising the steps of: generating sine wave signals; frequency modulating a carrier frequency with said sine wave signals with a relatively high modulation index and relatively low deviation to provide a first frequency modulated signal having high order side bands without amplitude modulation signals; receiving the transmitted signal reflected from a distnant object; providing a second frequency modulated signal identical to said first frequency modulated signal; mixing the received signal with said second frequency modulated signal; filtering the signal resulting from said mixing to pass one side band at least as high as the sixth; detecting the signal resulting from said filtering; and shifting the phase from one of said frequency modulated signals with respect to the other by a fixed amount sufficient to provide in said one side band a first response peak at close range and a second response peak at a substaitially greater range with no response peaks therebetween.

11. The method of obtaining radar range discrimination in a continuous wave radar system comprising the steps of: generating sine wave signals; frequency modulating a carrier frequency with said sine wave signals to provide a first frequency modulated signal; transmitting said first frequency modulated signal; frequency modulating said carrier frequency with said sine wave signals to provide a second frequency modulated signal; receiving the transmitted signalreflected from a distant object; mixing the received signal with said second frequency modulated signal; filtering the signal resulting from said mixing to pass one side band at least as high as the sixth; detecting the signal resulting from said filtering; and shifting the phase from one of said frequency modulated signals with respect to the other by a fixed amount sufficient to provide in said one side band a first response peak at close range and a second response peak at a substantially greater range with no response peaks therebetween.

12. The method of obtaining radar range discrimination in a continuous wave radar system comprising the steps of: generating sine wave signals; frequency modulating a carrier frequency with said sine wave signals to provide a first frequency modulated signal; transmitting said first frequency modulated signal; receiving the transmitted signal; mixing the received signal and a portion of the transmitted signal; filtering the signal resulting from said mixing to pass one side band at least as high as the sixth; detecting the signal resulting from said filtering; and phase shifting said transmitted signal portion with respect to the transmitted signal by a fixed amount sufficient to provide in said one side band a first response peak at close range and a second response peak at a substantially greater range with no response peaks therebetween.

* * * * *